(12) United States Patent
Challener et al.

(10) Patent No.: US 6,718,468 B1
(45) Date of Patent: *Apr. 6, 2004

(54) METHOD FOR ASSOCIATING A PASSWORD WITH A SECURED PUBLIC/PRIVATE KEY PAIR

(75) Inventors: David Carroll Challener, Raleigh, NC (US); Richard Alan Dayan, Wake Forest, NC (US); James Peter Ward, Raleigh, NC (US); Michael Vanover, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/439,236

(22) Filed: Nov. 12, 1999

(51) Int. Cl.[7] .................................................. H04L 9/32
(52) U.S. Cl. .................... 713/184; 713/183; 713/202
(58) Field of Search ................................ 713/184, 202, 713/182, 183

(56) References Cited

U.S. PATENT DOCUMENTS

| | | | |
|---|---|---|---|
| 5,398,285 A | 3/1995 | Borgelt et al. | |
| 5,511,122 A | 4/1996 | Atkinson | |
| 5,734,718 A | 3/1998 | Prafullchandra | |
| 5,768,373 A | 6/1998 | Lohstroh et al. | |
| 5,812,669 A | 9/1998 | Jenkins et al. | |
| 5,812,764 A | 9/1998 | Heinz, Sr. | |
| 5,825,300 A | 10/1998 | Bathrick et al. | |
| 5,953,422 A | 9/1999 | Angelo et al. | |
| 6,061,799 A * | 5/2000 | Eldridge et al. | 713/202 |
| 6,081,893 A * | 6/2000 | Grawrock et al. | 713/183 |
| 6,111,956 A * | 8/2000 | Field et al. | 380/283 |
| 6,170,058 B1 * | 1/2001 | Kausik | 713/193 |
| 6,178,409 B1 * | 1/2001 | Weber et al. | 705/79 |
| 6,230,272 B1 * | 5/2001 | Lockhart et al. | 713/202 |
| 6,253,027 B1 * | 6/2001 | Weber et al. | 380/287 |
| 6,324,650 B1 * | 11/2001 | Ogilvie | 713/202 |
| 6,567,794 B1 * | 5/2003 | Cordery et al. | 705/60 |
| 6,594,759 B1 * | 7/2003 | Wang | 713/182 |
| 6,594,763 B1 * | 7/2003 | Madoukh | 713/200 |

* cited by examiner

Primary Examiner—Gilberto Barron
Assistant Examiner—Kambiz Zand
(74) Attorney, Agent, or Firm—Bracewell & Patterson LLP; Martin McKinley

(57) ABSTRACT

A method for associating a password with a secured public/private key pair is disclosed. A user public/private key pair is first established for a user. The user public/private key pair includes a user public key and a user private key. Then, the user public/private key pair is encrypted along with a random password, utilizing a chip public key. Next, a first password is generated by hashing a pass phrase. Finally, the random password is encrypted along with the first password, also utilizing the chip public key. As a result, a user can assess the user private key to perform an authentication function by providing the pass phrase.

15 Claims, 2 Drawing Sheets

METHOD FOR ASSOCIATING A PASSWORD WITH A SECURED PUBLIC/PRIVATE KEY PAIR

CROSS-REFERENCE TO A RELATED PATENT APPLICATION

The present invention is related to the subject matter of a United States Patent Application entitled "DATA PROCESSING SYSTEM AND METHOD FOR MAINTAINING SECURE USER PRIVATE KEYS IN NON-SECURE STORAGE," filed on Mar. 3, 1999, Ser. No. 09/262,123 now abandoned.

BACKGROUND OF THE INVENTION

1. Technical Field

The present invention relates to a method and system for data processing in general, and in particular to a method and system for providing data security. Still more particularly, the present invention relates to a method for associating a password with a secured public/private key pair.

2. Description of the Prior Art

Cryptography involves a method for encrypting data in order to provide protection and security for the data. For example, before the transmission of a message from one party to another, the message can be encrypted using a mathematical function known as a cryptographic algorithm. The most common cryptographic algorithms are key-based, where special knowledge of variable information called a "key" is required to decrypt an encrypted message. There are two prevalent types of key-based cryptographic algorithms, namely, symmetric key (or secret key) algorithms and public key (asymmetric key) algorithms. The security provided by these cryptographic algorithms is centered around the keys and not the details of the cryptographic algorithms. In other words, the cryptographic algorithms can typically be known to all, but the keys can only be known by intended parties. As a result, it is possible to publish the cryptographic algorithm for public scrutiny, and then mass produce the cryptographic algorithm for incorporation into security products.

In most symmetric key algorithms, such as Data Encryption Standard (DES), the encryption key and the decryption key are the same. This single key encryption arrangement is not flaw-free because the sender and recipient of a message must somehow exchange information regarding the secret key. Each side must trust the other not to disclose the key. Furthermore, the sender must generally communicate the key via another relatively secure communication path (similar to a bank sending the personal identification number for an ATM card through the mail). This arrangement is not practical when, for example, the parties interact electronically for the first time over a computer network.

With public key algorithms, by comparison, the key used for encryption is different from the key used for decryption. It is generally very difficult to calculate the decryption key from an encryption key. In a typical operation, the public key used for encryption is made public via a readily accessible directory, while the corresponding private key used for decryption is known only to the recipient of the encrypted message. In an exemplary public key transaction, a sender retrieves the recipient's public key and uses it to encrypt the message prior to sending the message. The recipient then decrypts the encrypted message with the corresponding private key. It is also possible to encrypt a message using a private key and decrypt the encrypted message using a public key, which is sometimes used in digital signatures to authenticate the source of a message.

One of the more popular public key algorithms is RSA (named after its inventors—Rivest, Shamir, and Adleman). With RSA, when a message is encrypted utilizing a user public key, the encrypted message may only be decrypted utilizing a user private key. In one implementation, each user private key is also associated with a password, and both are enclosed within an individual secure wrapper. All user private keys along with their respective passwords are stored in a protected storage area within an encryption/decryption device, such as a signature chip. In order to allow the signature chip to perform an authentication procedure, such as signing signatures, a user must provide a correct password to the signature chip. The details of this process can be found in the above-mentioned copending application, the pertinent portion of which is incorporated by reference herein. For security purposes, it is important that no copy of any user private key exists outside the secure wrapper. Thus, a user private key and its respective password can only be unwrapped inside the signature chip, leaving no opportunity for the password to be changed. Nonetheless, for mnemonic reasons such as to allow for a password that is more memorable to a human user (the initial password is generated by a random number generator) and other security reasons such as to protect the private key after the password has been inadvertently disclosed, it is important that the password within the secure wrapper be changed periodically. Consequently, it would be desirable to provide an improved method for associating a password with a secured user public/private key pair.

SUMMARY OF THE INVENTION

In accordance with a preferred embodiment of the present invention, a user public/private key pair is first established for a user. The user public/private key pair includes a user public key and a user private key. Then, the user public/private key pair is encrypted along with a random password, utilizing a chip public key. Next, a first password is generated by hashing a first pass phrase. Finally, the random password is encrypted along with the first password, also utilizing the chip public key. As a result, a user can assess the user private key to perform an authentication function by providing the first pass phrase.

If the first password needs to be changed, a second password is generated by hashing a second pass phrase. The random password is then encrypted along with the second password, utilizing the chip public key. At this point, the user can assess the user private key to perform the authentication function by providing the second pass phrase.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DESCRIPTION OF A PREFERRED EMBODIMENT

The present invention may be utilized in a variety of computer systems under a number of different operating systems. The computer systems may be, for example, a personal computer, a mid-range computer, or a mainframe computer. In addition, the computer system may be a stand-alone system or part of a network such as a local-area network (LAN) or a wide-area network (WAN).

Figure 1:
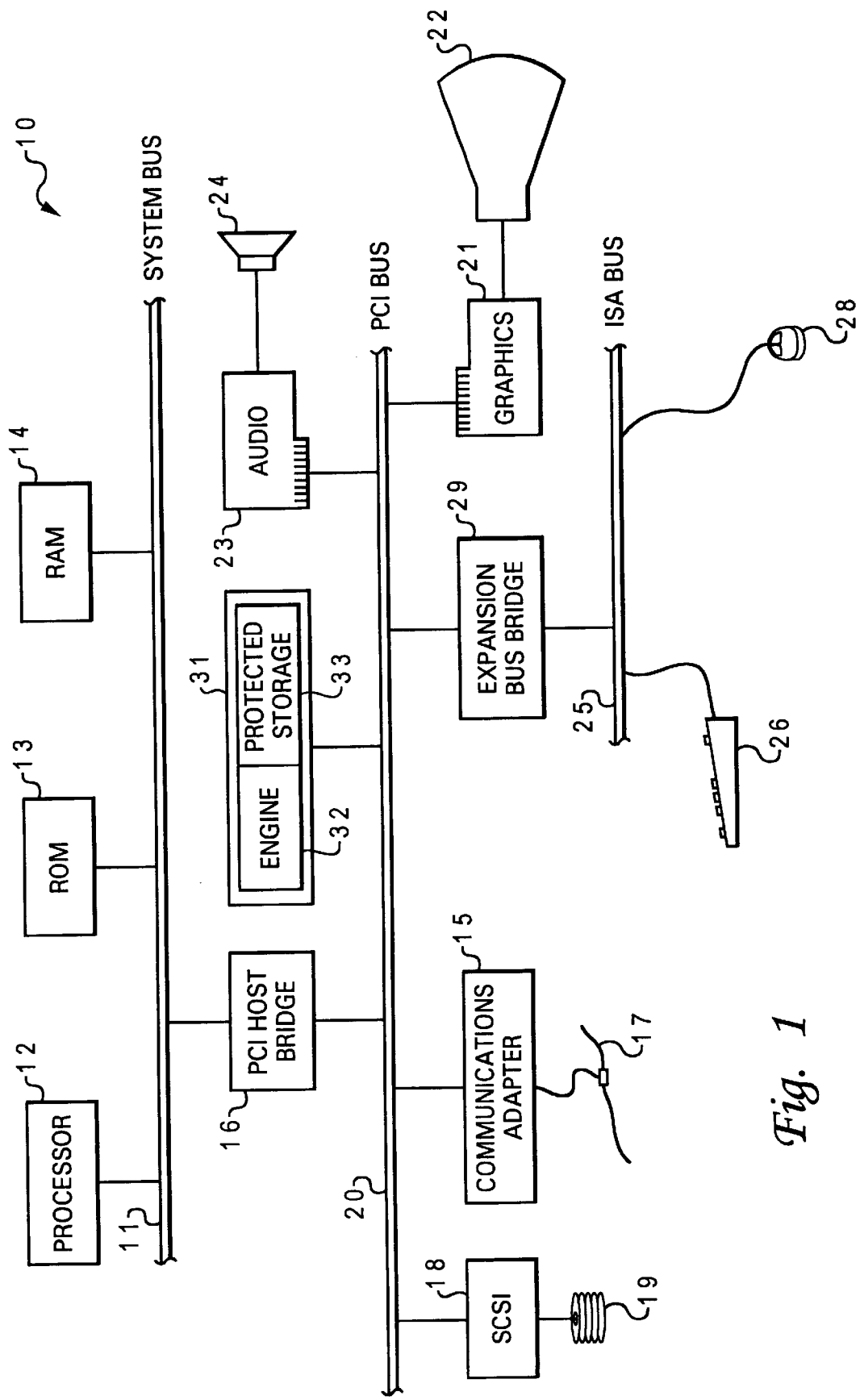
FIG. 1 is a block diagram of a computer system in which a preferred embodiment of the present invention is implemented.

Referring now to the drawings and in particular to FIG. 1, there is illustrated a block diagram of a computer system in which a preferred embodiment of the present invention is implemented. As shown, a processor 12, a read-only memory (ROM) 13, and a Random Access Memory (RAM) 14 are connected to a system bus 11 of a computer system 10. Processor 12, ROM 13, and RAM 14 are also coupled to a PCI bus 20 of computer system 10 through a PCI host bridge 16. PCI host bridge 16 provides a low latency path through which processor 12 may directly access PCI devices mapped anywhere within bus memory and/or I/O address spaces. PCI host bridge 16 also provides a high bandwidth path allowing PCI devices to directly access RAM 14.

Also attached to PCI bus 20 is a communications adapter 15 and a small computer system interface (SCSI) 18. Communications adapter 15 connects computer system 10 to a local-area network (LAN) 17. SCSI 18 is utilized to control a high-speed SCSI disk drive 19. Expansion bus bridge 29, such as a PCI-to-ISA bus bridge, may be utilized for coupling an ISA bus 25 to PCI bus 20. As shown, a keyboard 26 and a mouse 28 may be attached to ISA bus 25 for performing certain basic I/O functions. In addition, an audio adapter 23 and a graphics adapter 21 may be attached to PCI bus 20. Graphics adapter 21 controls visual output through a video monitor 22 and audio adapter 23 controls audio output through a speaker 24.

In addition, a security device, such as a signature chip 31, which contains an encryption/decryption engine 32 and a protected storage area 33, is coupled to PCI bus 20. Encryption/decryption engine 32 includes an encryption/decryption algorithm that is utilized to encode and decode messages transmitted and received by computer system 10. Encryption/decryption engine 32 preferably performs public/private key encryption and decryption. Protected storage area 33 is utilized to store user public/private key pairs. User public/private key pairs stored within protected storage area 33 are protected by encryption/decryption engine 32 and are not directly accessible to computer system 10 or its other components. Protected storage area 33 may be implemented with an electronically erasable storage device.

Each user of computer system 10 has a separate and unique user public/private key pair established for each application within computer system 10. The term "user" is understood to mean a person, a service, an application, a device, or any other entity that may access an application. The term "user" is not limited to a human user. A certificate may be established within computer system 10 for a user to access a particular application. The certificate may be specifically established for and associated with a particular user and a particular application. The certificate preferably includes a pointer to its associated application, an identity of the user associated with this certificate, and a pointer to the user private key associated with the user of this certificate and application. When an application needs to transmit an encrypted message or to perform an authentication procedure, encryption/decryption engine 32 accesses the user private key pointed to by the application's associated certificate, and then encrypts the message or signs a signature utilizing the user private key.

Figure 2A:
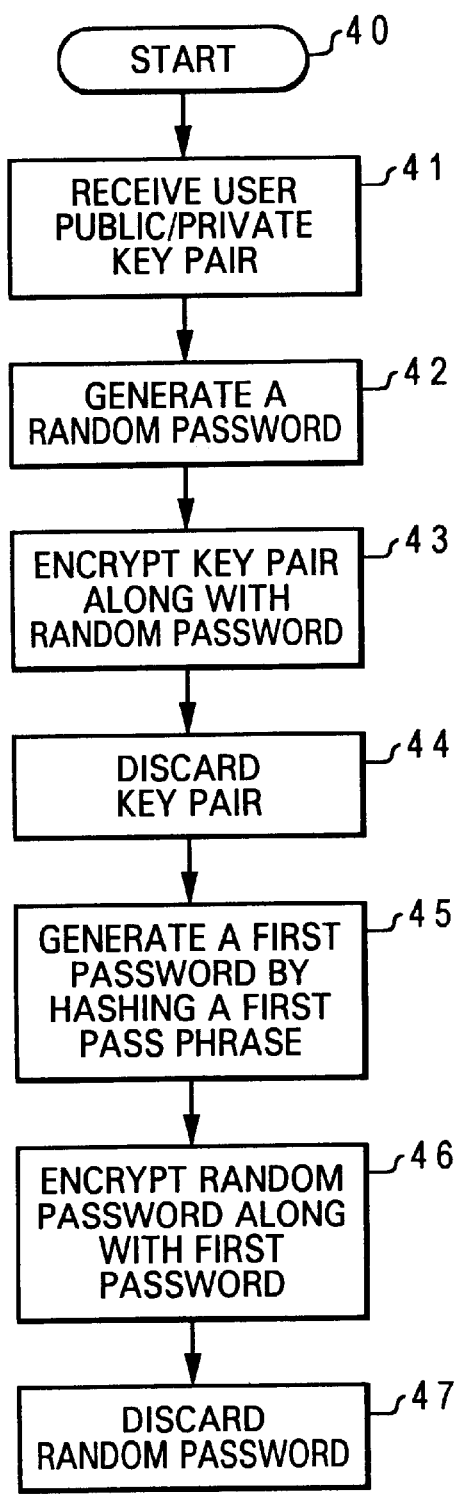
FIG. 2a is a high-level logic flow diagram of a method for associating a password with a user public/private key pair, in accordance with a preferred embodiment of the present invention.

With reference now to FIG. 2a, there is illustrated a high-level logic flow diagram of a method for associating a password with a secured user public/private key pair, in accordance with a preferred embodiment of the present invention. Starting at block 40, a user public/private key pair is first received by a signature chip (such as signature chip 31 from FIG. 1), as shown in block 41. Typically, this user public/private key pair has already been certified with the proper authority. A random password, preferably 64 bits in length, to be associated with the user public/private key pair is then generated for the user, as depicted in block 42. This random password, which is preferably generated by a random generator, is typically very difficult for a human user to remember. Utilizing a chip public key, the random password is then encrypted along with the user public/private key pair, as shown in block 43. The chip public key may come from an unprotected or protected storage area of the signature chip. The encrypted package of the random password and user public/private key pair is then stored in a hard disk, such as SCSI disk drive 19 as shown in FIG. 1. At this point, any record of the user public/private key pair outside the signature chip can be discarded (by the human user) for security reasons, as depicted in block 44.

Next, a first password is generated by hashing a first pass phrase, as shown in block 45. A pass phrase is utilized because a pass phrase permits greater permutation, and thus added security, not to mention a pass phrase is easier for a human user to remember than the random password. Utilizing the chip public key, the first password is then encrypted along with the random password, as depicted in block 46. The encrypted package of the first password and random password can then also be stored in the hard disk. At this point, any record of the random password outside the signature chip can also be discarded (by the human user) for security reasons, as illustrated in block 47.

During operation, a first pass phrase sent by a user is hashed by a processor, such as processor 12 in FIG. 1, in a system memory, such as RAM 14 in FIG. 1, to obtain its corresponding first password. This first password along with the encrypted package of the first password and random password (from the hard disk) are then sent to the signature chip. The signature chip decrypts the encrypted package of the first password and random password. The signature chip then compares the first password from the decrypted package of the first password and random password with the sent first password. The signature can use the random password in the decrypted package if both first passwords match with each other. Because the random password is much less than 1,024 bits, the signature chip recognizes that the random password is not a signature key (i.e., the user private key of the user public/private key pair), and hence exports the random password to the system memory. The random password is subsequently sent to the signature chip along with a copy of the encrypted user public/private key pair stored in the hard drive to authorize the signature chip to perform a signatory function using the user private key.

Figure 2B:
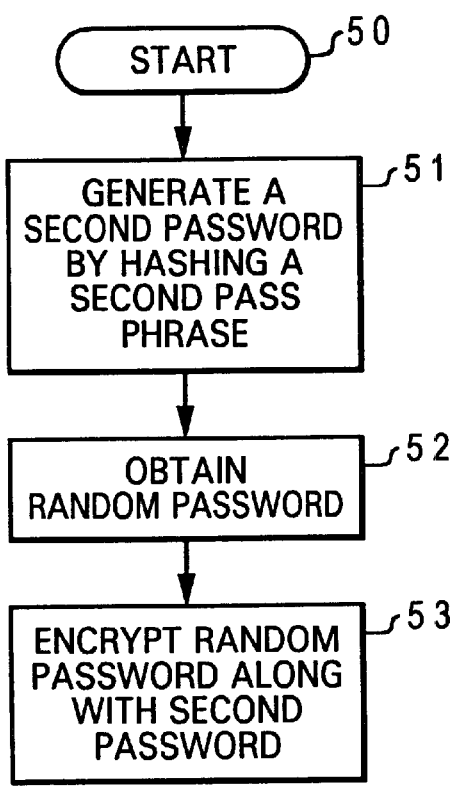
FIG. 2b is a high-level logic flow diagram of a method for changing the associated password from FIG. 2a, in accordance with a preferred embodiment of the present invention.

With reference now to FIG. 2b, there is illustrated a high-level logic flow diagram of a method for changing the associated password from FIG. 2a, in accordance with a preferred embodiment of the present invention. Starting at block 50, a second password is generated by hashing a second pass phrase, as shown in block 51. Similar to the first pass phrase from block 45 of FIG. 2a, the second pass phrase is also chosen by the human user and it should be easy for the human user to remember. The first pass phrase (from block 45 of FIG. 2a) is sent by the user to the processor to hash, and the hashed result (i.e., the first password) is sent to the signature chip along with a copy of the encrypted package of the first password and random password, to obtain the corresponding random password from the signature chip, as depicted in block 52. Utilizing the chip public key, the second password is then encrypted along with the obtained random password, as illustrated in block 53. The encrypted package of the second password and random password is subsequently stored in the hard disk. As such, the first (old) pass phrase for accessing the user private key to provide an authentication function has been replaced by the second (new) pass phrase.

As has been described, the present invention provides an improved method for associating a password with a secured user public/private key pair. Although the password is preferably encrypted with both user public and private keys (as shown in block 43 of FIG. 2a), it is sufficient to encrypt the password and only the user private key from the user public/private key pair.

It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for associating a password with a secured user public/private key pair within a computer system, said method comprising:
   establishing a user public/private key pair for a user, wherein said user public/private key pair includes a user public key and a user private key;
   encrypting said user private key along with a random password;
   generating a first password by hashing a first pass phrase;
   encrypting said random password along with said first password; and
   utilizing said first pass phrase to access said user private key for performing an authentication function;
   generating a second password by hashing a second pass phrase;
   encrypting said random password along with said second password; and
   providing said second pass phrase to access said user private key for performing an authentication function.

2. The method according to claim 1, wherein encrypting said user private key along with said random password is performed utilizing a chip public key.

3. The method according to claim 1, wherein encrypting said random password along with said first pass phrase is performed utilizing a chip public key.

4. The method according to claim 1, wherein encrypting said user private key along with a random password further includes encrypting said user private key and said random password along with said user public key.

5. The method according to claim 1, wherein encrypting said random password along with said second pass phrase is performed utilizing a chip public key.

6. A computer system having a password associated with a secured user public/private key pair, said computer system comprising:
   means for establishing a user public/private key pair for a user, wherein said user public/private key pair includes a user public key and a user private key;
   means for encrypting said user private key along with a random password;
   means for generating a first password by hashing a first pass phrase;
   means for encrypting said random password along with said first password; and
   means for utilizing said first pass phrase to access said user private key for performing an authentication function;
   means for generating a second password by hashing a second pass phrase;
   means for encryption said random password along with said second password; and
   means for providing said second pass phrase to access said user private key for performing an authentication function.

7. The computer system according to claim 6, wherein means for encrypting said user private key performs an encryption utilizing a chip public key.

8. The computer system according to claim 6, wherein means for encrypting said random password performs an encryption utilizing a chip public key.

9. The computer system according to claim 6, wherein means for encrypting said user private key along with a random password further includes a means for encrypting said user private key and said random password along with said user public key.

10. The computer system according to claim 6, wherein means for encrypting said random password along with said second pass phrase is performed utilizing a chip public key.

11. A computer program product for associating a password with a secured user public/private key pair within a computer system, said computer program product comprising:
   program code means for establishing a user public/private key pair for a user, wherein said user public/private key pair includes a user public key and a user private key;
   program code means for encrypting said user private key along with a random password;
   program code means for generating a first password by hashing a first pass phrase;
   program code means for encrypting said random password along with said first password; and
   program code means for utilizing said first pass phrase to access said user private key for performing an authentication function;
   program code means for generating a second password by hashing a second pass phrase;
   program code means for encrypting said random password along with said second password; and
   program code means for providing said second pass phrase to access said user private key for performing an authentication function.

12. The computer program product according to claim 11, wherein program code means for encrypting said user private key performs an encryption utilizing a chip public key.

13. The computer program product according to claim 11, wherein program code means for encrypting said random password performs an encryption utilizing a chip public key.

14. The computer program product according to claim 11, wherein said program code means for encrypting said user private key along with a random password further includes encrypting said user private key and said random password along with said user public key.

15. The computer program product according to claim 11, wherein said program code means for encrypting said random password along with said second pass phrase performs an encryption utilizing a chip public key.

* * * * *